US008385518B1

(12) United States Patent
Salafia et al.

(10) Patent No.: US 8,385,518 B1
(45) Date of Patent: Feb. 26, 2013

(54) INTEGRATED CALL HANDLER AND EMAIL SYSTEMS AND METHODS

(75) Inventors: Christopher Michael Salafia, Killingworth, CT (US); Jeremy Edward Turk, Guilford, CT (US)

(73) Assignee: Powerphone, Inc., Madison, CT (US)

( * ) Notice: Subject to any disclaimer, the term of this patent is extended or adjusted under 35 U.S.C. 154(b) by 1786 days.

(21) Appl. No.: 11/621,473

(22) Filed: Jan. 9, 2007

Related U.S. Application Data

(63) Continuation-in-part of application No. 10/913,880, filed on Aug. 6, 2004, now Pat. No. 7,515,693.

(60) Provisional application No. 60/821,915, filed on Aug. 9, 2006.

(51) Int. Cl.
*H04M 11/00* (2006.01)
(52) U.S. Cl. ..... 379/88.22; 379/45; 379/37; 379/265.09
(58) Field of Classification Search ............. 379/37–45, 379/265.09; 455/404.1; 348/211.1; 709/206
See application file for complete search history.

(56) References Cited

U.S. PATENT DOCUMENTS

| | | | | |
|---|---|---|---|---|
| 6,084,870 | A * | 7/2000 | Wooten et al. | 370/349 |
| 7,424,282 | B2 * | 9/2008 | Barbeau | 455/404.1 |
| 2005/0144235 | A1 * | 6/2005 | Bednall | 709/206 |
| 2007/0016647 | A1 * | 1/2007 | Gupta et al. | 709/206 |
| 2008/0019267 | A1 * | 1/2008 | Ku et al. | 370/229 |
| 2008/0037762 | A1 * | 2/2008 | Shaffer et al. | 379/265.09 |

* cited by examiner

*Primary Examiner* — Melur Ramakrishnaiah
(74) *Attorney, Agent, or Firm* — Maier & Maier PLLC

(57) ABSTRACT

Apparatuses, systems and methods are presented for handling calls. In one embodiment, an emergency call handling system capable of receiving visual information from callers and correlating the visual information to particular incidents is disclosed. To obtain visual information, a call handler may generate and send an electronic mail message to the caller. The caller may reply to the electronic mail message and attach an image captured with, for example, a camera phone. The visual information may then be correlated to the call between the caller and call handler. The visual information may be used to assess an emergency situation. The visual information may be forwarded to emergency service providers.

39 Claims, 7 Drawing Sheets

FIG. 5

INTEGRATED CALL HANDLER AND EMAIL SYSTEMS AND METHODS

CROSS REFERENCE TO RELATED APPLICATIONS

This patent application claims priority to and, thus, the benefit of an earlier filing date from U.S. Provisional Patent Application No. 60/821,915 (filed Aug. 9, 2006), the entire contents of which are hereby incorporated within by reference. This patent application is also a continuation-in-part patent application of co pending and commonly owned U.S. patent application Ser. No. 10/913,880 (filed Aug. 6, 2004), the entire contents of which are hereby incorporated within by reference.

BACKGROUND

Call handling of either emergency or non-emergency related situations is a process of interacting with a caller to exchange information. The caller may have contacted a particular agency or service provider to gain assistance. For example, a caller may dial 911 seeking emergency assistance. Another example is where a caller dials an information service to obtain driving directions or addresses.

A particular caller may contact a particular agency or service provider to forward information. For example, a caller may dial 911 to report an emergency situation that the caller has witnessed, such as a crime, an automobile accident or a building fire. An example of a non-emergency situation would be where the caller calls to report local driving or weather conditions or a crime tip line. Whether the caller is calling to gain assistance or report information, a call handler, who may be specially trained in quickly and efficiently exchanging information with a caller, may handle the call.

A critical application of call handling is in the provision of emergency services. In an emergency situation, the call handler may need to quickly extract information from the caller in order to assist the caller. Such is typically the case in emergency medical situations where the call handler must ascertain the type and extent of injury in order to give relevant instructions. Generally, in an emergency situation, a caller will dial 911 and be connected to a local Public Safety Answering Point (PSAP). The PSAP is generally staffed with a group of specially trained call handlers. Typically, the call handlers will respond to callers according to protocols, often dispatching emergency service providers. Call handling is often employed with Computer Aided Dispatch ("CAD") systems that dispatch response units, such as police, fire and/or medical units, based on received information. For example, call handling of prior art CAD systems typically involves call handlers who receive calls describing certain events. The call handlers subsequently convey this information to a dispatch unit by manually inputting information into the CAD system, which then recommends the appropriate dispatch unit(s) for response to the event.

Typically, a call handler working in a PSAP will receive textual information, displayed on a computer terminal, regarding the probable location of a caller. If the caller is calling from a landline, systems at the PSAP may access an automatic location information (ALI) database to determine the location of the caller. Accordingly, errors in the ALI database may result in incorrect determinations of caller location. Therefore, the call handler may need to verify the location of the caller. If the caller is calling from a mobile wireless device (e.g., cell phone), location information, if available at all, may not be determinable in the same manner as for landlines. Location information of a caller using a mobile wireless device presented to a call handler may be derived from triangulating signals transmitted by the cell phone. The accuracy of such a location may be dependent on the number of cell towers and signal strength. Global Positioning System (GPS) location data may also be available if the caller is using a cell phone with GPS capabilities. However, GPS systems may be unreliable, for example, if the caller is indoor. Accordingly, in the case of mobile wireless devices, the call handler may need to provide and/or verify the location of the caller.

Generally, the location of the caller is only one part of the information that is exchanged between the caller and the call handler in an emergency situation. For example, at the scene of a major traffic accident, the caller may need to communicate the number of people injured, the number of vehicles involved, location and condition of the vehicles, current conditions (e.g., fog, ice, etc.), and many other aspects of the situation. In current emergency call handling systems, all of this information is communicated verbally between the caller and the call handler and the call handler may forward this information, either verbally or textually, to at least one emergency services provider.

SUMMARY

This invention generally relates to call handling. More specifically, this invention relates to correlating call information to visual information received from the caller. The present inventors have recognized that many aspects of the process of call handling may be significantly enhanced through the incorporation of the transfer of visual and/or textual information. The transfer of visual information may occur between a caller and a call handler. For example, in an emergency situation, a caller may dial 911 to contact a call handler at a Public Service Answering Point (PSAP). It may then be beneficial for the caller to transfer visual information regarding the emergency to the call handler. By reviewing the visual information, the call handler may gain a better understanding of the emergency situation. The call handler may forward the information, including the visual information, to at least one emergency services provider.

The visual information may, for example, include information regarding the exact location of the caller. This may be particularly valuable where the caller is calling from a mobile wireless device, such as a cell phone, and an exact location would otherwise be unavailable or difficult to obtain. The visual information may includes images of a victim, a suspect, an accident scene or any other emergency or non-emergency subject that may enhance the effectiveness of the communication between the call handler and caller. The call handler may also send visual information to the caller, such as, for example, visual instruction on how to handle a particular situation or perform a particular task.

Whether in an emergency situation or a non-emergency situation, the transfer of visual information between the caller and the call handler may result in faster and more efficient transfer of information. In emergency situations, this may result in faster and more appropriate provision of emergency services. A call handler may also forward the visual information received from the caller to third parties, such as, for example, an emergency services provider. The emergency services provider may use the visual information to determine an appropriate response, for example, in terms of equipment, personnel and procedures to be used in response to the emergency.

The visual information may serve as a recordation of the events that prompted the caller to contact the call handler. The visual information may be an image of a suspect and may serve as evidence in a criminal investigation. The visual information may be in the form of an image of a vehicle involved in an accident or crime. The visual information may be of a suspected missing person. The visual information may be used as evidence in subsequent civil proceedings. The visual information may be used to help determine a cause of an emergency situation or be used by investigators to analyze a particular chain of events.

Accordingly, systems and methods are presented herein to enable the efficient transfer of visual information between a caller and a call handler. These systems and methods provide the aforementioned benefits. It will be appreciated that other benefits of the ability to quickly and efficiently transfer visual information between a caller and call handler will be apparent to those skilled in the art and are intended to be within the scope of the present invention.

In an aspect of the present invention, an information processing system is provided that includes a network interface, a telephonic interface, a call handler interface, a storage unit, and a processing module. The network interface may be operable to receive and transmit packetized information over a computer network. In one embodiment, the computer network may be the Internet. The packetized information may be in the form of electronic mail messages consisting of text, visual information in the form of image files, or a combination thereof.

The telephonic interface may be used for audio communication between at least one call handler and at least one caller over a telephone network. In one embodiment, the telephone network may be the public switched telephone network (PSTN), a cellular network, or a combination thereof. The telephonic interface may be a standard telephone headset or handset. The telephone network may include a public safety answering point (PSAP). The audio communication may be an emergency related, non-emergency related, or a combination thereof. In one embodiment, the audio communication between the caller and the call handler may be emergency related. To initiate the audio communication, the caller may dial 911.

The call handler interface may be operable to generate at least one outgoing message. The call handler interface may be operable to send the outgoing message to the caller. The outgoing message may include a unique identifying component. In one embodiment, the call handler interface may be in the form of a personal computer or computer terminal accessible by the call handler. The outgoing message may be an electronic message, for example, an electronic mail message. The call handler interface may be operable to present to the call handler a plurality of outgoing message templates. The call handler may then select a particular outgoing message template that is appropriate for the circumstances of the call. The selecting of the outgoing message template may be in the form of selecting a particular outgoing message template identified by a menu item or an item in a pull-down menu presented to the operator by a display screen of the call handler interface. The call handler may then use the selected outgoing message template to generate an outgoing message to be sent to the caller. The outgoing message may be sent over the computer network.

The unique identifying component of the outgoing message may, for example, be located in a message header of the outgoing message. In one embodiment, the unique identifying component may be a string of alphanumeric characters. For example, the unique identifying component may include alphanumeric characters representing the date on which the outgoing message was first generated concatenated with a sequential serial number.

The storage unit may be configured to store information related to the caller, the particular call between the caller and the call handler, or any combination thereof. In one embodiment, the storage unit may, for example, be a hard drive such as those commonly used to store information in digital form.

The processing module may be coupled to the storage unit, the call handler interface, and the network interface. The unique identifying component of a particular outgoing message may be stored in the storage unit in relation to information pertaining to the particular call that resulted in the generation of the outgoing message. The processing module may be operable to correlate an incoming message received over the computer network to the information pertaining to the particular call that resulted in the generation of the outgoing message and the subsequent reception of the incoming message. In one embodiment, the processing module may be operable to present to the call handler the incoming message along with information related to the particular call that resulted in the reception of the incoming message.

In another aspect of the present invention, an emergency call handling system is provided that includes a network interface module, a communication interface, a call handler interface, a storage unit, and a processor module. The network interface may be operable to receive and transmit packetized information over a computer network, such as the Internet. The communication interface may be interconnected with a PSAP. The call handler interface may generate an outgoing message that includes a unique identifying component. The storage unit may store the unique identifying component in relation to a record of a call. The processing module may correlate incoming messages received over the computer network to the record, stored in the storage unit, of a particular call. The call handler interface may display at least part of an incoming message along with a record of the specific call with which the incoming message was correlated.

In another aspect of the present invention, a call handling system is provided that includes a database, a call handler interface, and an electronic message processing module. The database may be configured to store a plurality of electronic message templates, information regarding a call from a caller, and a unique identifying component for the call. The call handler interface may be operable to enable a call handler to select an electronic message template from the plurality of electronic message templates stored in the database. The call handler interface may be operable to initiate the sending of an electronic message to the caller, where the electronic message contains the unique identifying component for that call. The call handler interface may be operable to display information regarding the call and an image contained in a response to the electronic message sent by the call handler. The electronic message processing module may be operable to correlate the information regarding a particular call to the image contained in a response from the caller to the electronic message received by the caller. In one embodiment, the call may be emergency related.

In still another aspect, a method of communicating with a caller is provided that includes receiving a call, making a decision, based on the call, to obtain visual information from the caller, assigning a unique identifying component to a first message, including that unique identifying component in the first message, sending the first message, receiving a second message in response to the first message, and correlating the second message to the call. The call may be received over a telephone network, such as the PSTN, and may be emergency related. The decision to obtain visual information may be made as a result of the interaction between a call handler and a caller. The first message may be generated by selecting a message template from a plurality of available message templates. The first and second messages may be electronic mail messages. The unique identifying component assigned to the first message may be located in a header of the first message.

The first message may be sent to the caller over a computer network, such as the Internet. In one embodiment, the first message may contain an instruction regarding how to reply to the first message. For example, the instruction may direct the caller to reply to the first message by creating a second message and attaching visual information to the second message. This may be accomplished by the caller by, for example, attaching an image captured with a camera phone to a reply to the first image and sending that reply message (i.e., the second message) to a call handler. In one embodiment, the electronic mail message address of the caller may be determined and inserted into the first message prior to sending. The electronic mail message address of the caller may be determined by concatenating the phone number of the caller with a domain name of the caller. The domain name may be obtained by looking up the domain name in a database for the particular service provider of the caller.

The second message may contain visual information. The second message may contain the unique identifying component that was inserted into the first message. The visual information contained in the second message may be correlated to the call based on the unique identifying component. In one embodiment, the method of communicating with the caller may include displaying information about the call along with the visual information provided in the second message.

The method may include forwarding the visual information received in the second message. The visual information may be forwarded to an emergency services provider.

In a yet another aspect, a method of correlating visual information to a call is provided. The method includes receiving a call from a caller, sending an electronic mail message to the caller where the message includes a unique identifying component, receiving a reply message from the caller where the reply message includes the unique identifying component and visual information, and correlating the reply message to the call at least partially based on the unique identifying component.

Various embodiments and aspect described herein may be combined. Embodiments, features and steps described in conjunction with a particular aspect may be combined with other aspects described herein. Additional aspects and corresponding advantages of the present invention will be apparent to those skilled in the art upon consideration of the further description that follows.

BRIEF DESCRIPTION OF THE DRAWINGS

FIG. 5 is an illustration of a graphical user interface for communicating textual and visual information to a call handler.

DETAILED DESCRIPTION OF THE DRAWINGS

Figure 1:
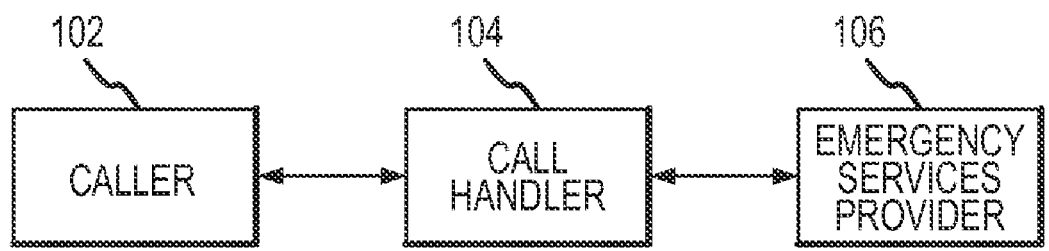
FIG. 1 is a block diagram of communication flow between a caller, a call handler and an emergency services provider.

While the invention is susceptible to various modifications and alternative forms, specific embodiments thereof have been shown by way of example in the drawings and will herein be described in detail. Those skilled in the art will appreciate that the features described below can be combined in various ways to form multiple variations of the invention. Accordingly, the invention is not limited to the specific examples described below.

FIG. 1 is a block diagram of communication flow between a caller 102, a call handler 104, and an emergency services provider 106. Generally, the caller 102 may initiate communication with the call handler 104. In the case of an emergency call, the caller 102 may dial 911 and be routed to an appropriate emergency services call handler 104. The caller 102 and the call handler 104 may exchange information regarding an emergency situation. The call handler 104 may also contact the emergency services provider 106. The emergency services provider of block 106, as used herein, may represent a single emergency services provider such as an ambulance service, or the emergency services provider of block 106 may represent multiple emergency services providers that may be engaged during any particular emergency situation. For example, in a large-scale emergency, multiple firefighting, law-enforcement, and medical units may be dispatched.

The call handler 104 may exchange information with the emergency services provider 106 regarding the emergency and the status of the caller 102. Generally, in prior art systems, the information exchanged between the caller 102 and call handler 104 is in the form of oral communications over a telephone network. Other information, such as location data of the caller 102, is also provided to the call handler 104, generally by equipment and databases interconnected to the telephone network. This information may also be provided to the emergency services provider 106.

Embodiments described herein provide systems and methods, which supplement the above information with visual information. This visual information may be captured by the caller 102, for example, with a camera phone, and forwarded to the call handler 104 using the apparatuses, systems and methods described herein. The call handler 104 may use the visual information in a variety of ways such as, for example, to determine a location of an emergency situation and/or to determine a course of action. The call handler 104 may forward the visual information to at least one emergency services provider 106 using the apparatuses, systems and methods described herein. The emergency services provider 106 may use the visual information, for example, to assess an emergency situation prior to arrival, to determine a location of the emergency situation, and/or otherwise assist in the provision of emergency services. The visual information may also be used in later investigations of, for example, the emergency situation and/or the performance of the call handler 104 and/or the emergency services provider 106 in their response to the emergency situation and provision of emergency services.

Figure 2:
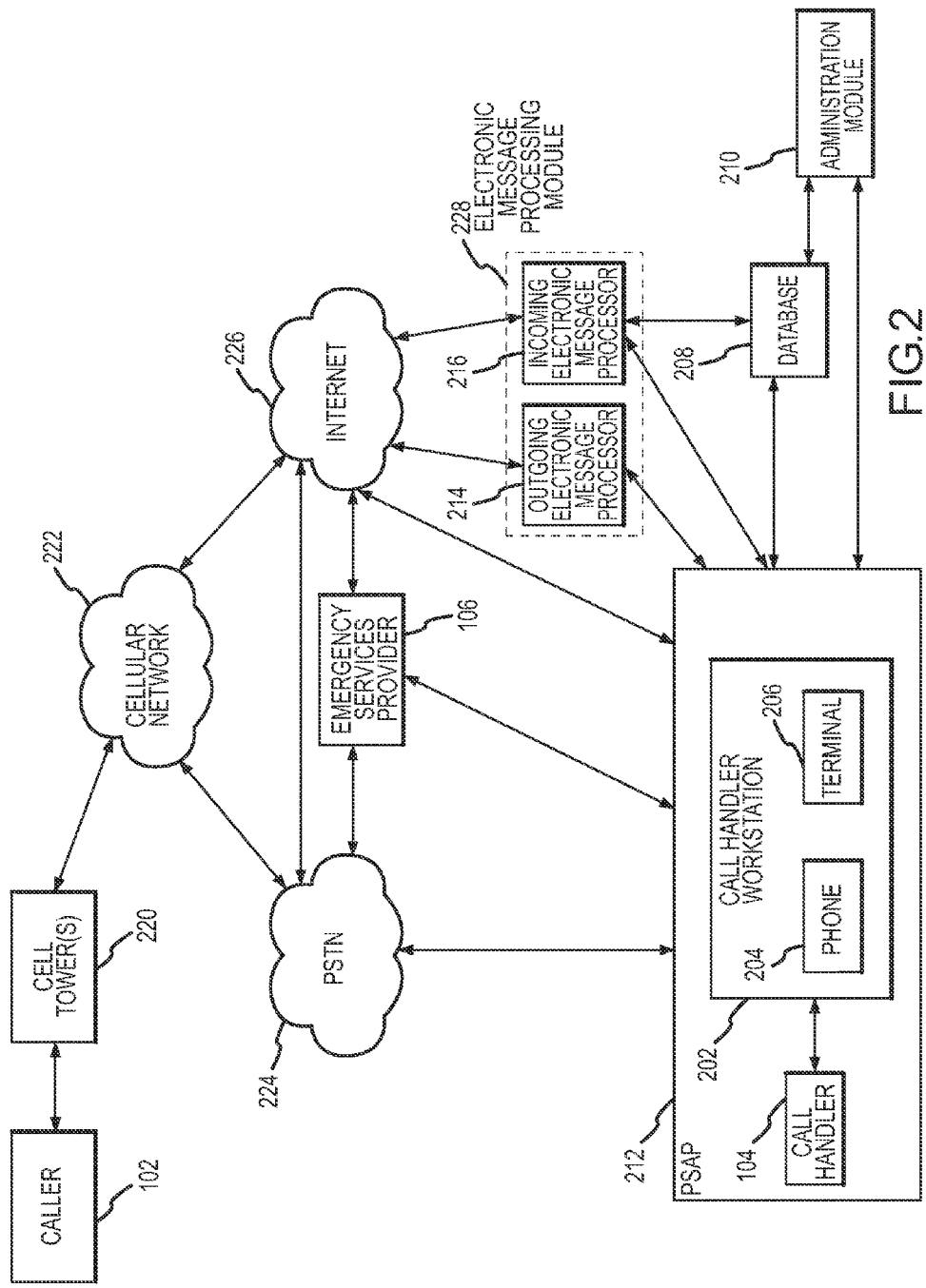
FIG. 2 is a block diagram of a communication network.

FIG. 2 is a block diagram of one embodiment interconnected to various communication networks to enable communication, including the transfer of visual information, between the call handler 104, the caller 102, and the emergency services provider 106. In the embodiment illustrated in FIG. 2, the caller 102 is communicating using a cell phone. Although generally described herein in terms of a caller 102 communicating using a cell phone, the caller 102 may be interconnected through other means such as, for example, land lines and satellite links. A caller 102 with the ability to receive and send electronic messages may communicate with the call handler 104 using the apparatuses, systems and methods described herein.

The caller 102 may be interconnected to one or more proximate cell towers 220 through wireless communication links. The cell towers 220 may be interconnected to a cellular network 222. The cell phone of the caller 102 may have the capability to generate, send, and receive electronic messages. The cell phone of the caller 102 may also have the capability to capture visual information which may be in the form of digital images which may be still images and/or video clips. The electronic messages may be in the form of text messages and/or messages including visual information.

The cellular network 222 may in turn be interconnected to the Public Switched Telephone Network (PSTN) 224 and the Internet 226. A Public Safety Answering Point (PSAP) 212 may be interconnected to the PSTN 224. The PSAP 212 is typically a local facility responsible for answering 911 calls and forwarding related information to emergency service providers 106. The PSAP 212 may contain multiple call handler workstations such as call handler workstation 202. The call handler workstation 202 may contain a phone 204 for audio communications with the call handler 104 and a terminal 206. The terminal 206 may be in the form of a computer interface including, for example, a video display device, keyboard and mouse. The PSAP 212 may be interconnected to the emergency services provider 106 in a variety of ways. For example, the PSAP 212 may be directly connected to the emergency services provider 106 via a dedicated communication line or wireless communication link. Alternatively or additionally, the PSAP 212 may be connected to the emergency services provider 106 via the PSTN 224.

A typical prior art 911 call from a cell phone user will now be described with reference to the aforementioned features of FIG. 2. The caller 102 dials 911 on his or her cell phone and presses send to connect the call. The cell phone communicates with one or more proximate cell towers 220 and interconnects with the cellular network 222. The cellular network 222 in turn interconnects with the PSTN 224 and the call is routed to a PSAP 212. Textual information about the call may appear on the terminal 206 of a call handler workstation 202 and an audio communication link between the caller 102 and the call handler 104 may be established. The textual information may include location data forwarded to the PSAP 212 by the cellular network 222. The location data may, for example, be based on cell tower 220 location and cell phone signal attributes or on GPS information obtained from the cell phone, the cellular services provider or some other source. The textual information may include a phone number of the caller 102. The call handler 104 and the caller 102, via the established audio communication link, discuss the emergency situation and the call handler 104 determines the appropriate emergency services provider 106 to respond to the emergency situation. The call handler 104 may then communicate details of the emergency situation to the emergency services provider 106. The call handler 104 may maintain communication with the caller 102 and the emergency services provider 106 as needed.

Additional features of FIG. 2 that facilitate textual and visual communication between the call handler 104 and the caller 102 will now be described. Currently, many cell phones and cellular networks possess the ability to generate, send, and receive electronic messages, such as electronic mail (e.g., e-mail), through interconnection to the Internet 226. Many cell phones possess the ability to capture visual information in the form of digital images, including still images and digital video. The PSAP 212 may contain or be interconnected to an electronic message processing module 228. The electronic message processing module 228 may facilitate the sending and receiving of electronic messages between the PSAP 212 and the Internet 226 and therefore to any other user or users connected to the Internet 226. This may be accomplished through one or more network interfaces of the electronic message processing module 228. In this regard, electronic messages may be communicated between the PSAP 212 and the caller 102.

The electronic message processing module 228 may include a single electronic message processing unit capable of processing incoming and outgoing electronic messages or the electronic message processing module 228 may, as shown in FIG. 2, include an outgoing electronic message processor 214 and an incoming electronic message processor 216. The incoming electronic message processor 216 may be linked to a database 208. The database 208 may contain information pertaining to outgoing electronic messages (i.e., outgoing from the PSAP 212) and telephone communications between various callers and the PSAP 212. The database 208 may also contain other various sets of information such as templates used in the generation of electronic messages and information related to domain names used by various cellular communication providers. The database 208 may be located within or remote from the PSAP 212. The database 208 may be an information storage unit such as, for example, a computer hard drive. An administration module 210 may also be interconnected to the database 208 and the PSAP 212. The administration module 210 may facilitate the maintenance and updating of various components within the PSAP 212. As with the database 208, the administration module 210 may be located within or remote from the PSAP 212. The PSAP 212 may also be directly interconnected to the Internet 226. Similarly, the electronic message processing module 228 may be located within the PSAP 212. The electronic message processing module 228 may be located within the call handler workstation 202.

Figure 3:
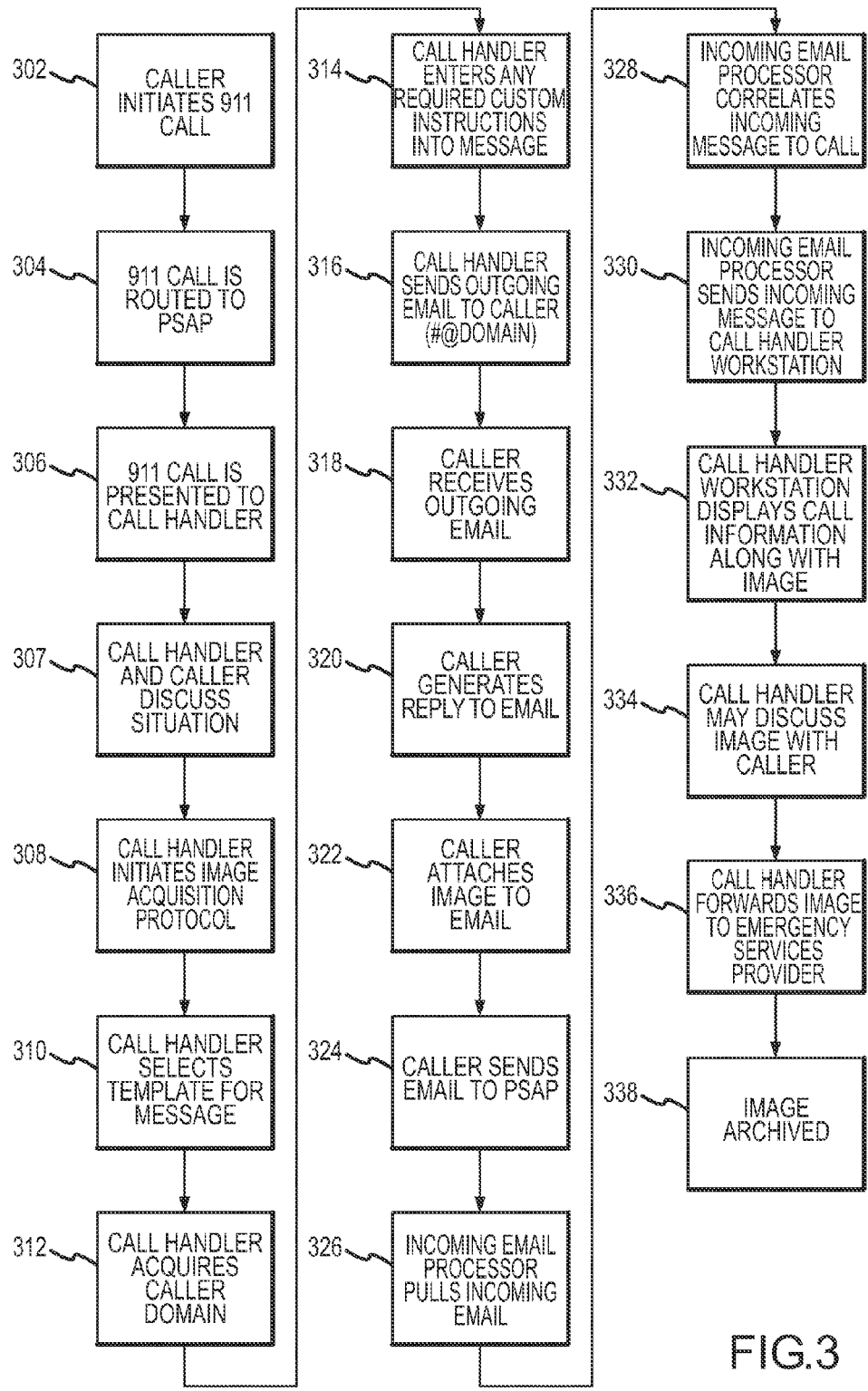
FIG. 3 is a flowchart of a process for handling an emergency call and gathering visual information.

FIG. 3 is a flowchart of an exemplary process for handling an emergency call and gathering visual information. The steps of FIG. 3 will now be described in detail in conjunction with the features illustrated in FIG. 2.

The first step 302 is the caller initiating an emergency call. This may be in response to a perceived emergency such as a medical emergency, a crime, an accident, or other situation requiring the presence of an emergency services provider 106. The initiation of the call may take the form of a caller 102 dialing 911 on his or her cell phone. This will initiate communication between the cell phone and one or more local cell towers 220 which will enable the caller 102 to communicate with the cellular network 222 of the caller's 102 cellular service provider. In the next step 304, the call may be routed through the cellular network 222 to the PSTN 224 and to the PSAP 212. The routing of cellular calls to appropriate PSAPs may be accomplished in a variety of ways known to those skilled in the art.

In the next step 306, the call may be presented to the call handler 104 at the PSAP 212. This may be in the form of a visual display of data associated with the call displayed on the terminal 206 of the call handler workstation 202 and a telephonic connection between the call handler 104 (via a phone 204) and the caller 102. The visual display of data on the terminal 206 may include information such as, for example, the telephone number of the caller 102, the cellular service provider of the caller 102, and approximate location of the caller 102, the name of the person or entity associated with the cell phone, and the time and date of the call. The visual display of data on the terminal 206 may be received from an ANI/ALI (Automatic Number Identification/Automatic Location Information) database. Other information may also be presented to the call handler 104 to assist the call handler 104 in the handling of the call. This may include blank fields for information to be determined by the call handler 104 during the course of the call.

The next step 307 may be for the call handler 104 and caller 102 to discuss the emergency situation. The discussion may be guided by emergency call protocols followed by the call handler 104. The discussion may include a determination by the call handler 104 that the caller 102 has the capability to send and receive electronic messages and that additional information in the form of a textual message or visual message from the caller 102 would be of value. The value may be immediate in that the information contained in the electronic message may, for example, aid in the response to the emergency situation. The value may be less immediate in that, for example, the information may serve as evidence for a later criminal investigation or forensic evidence for an investigation into the causes of the emergency situation.

Once it has been determined that an electronic message from the caller 102 would be beneficial, the next step 308 may be for the call handler 104 to initiate an image acquisition protocol. This initiation may take any of a variety of forms, such as entering a command using a keyboard or clicking on a button on the display of the terminal 206 using a mouse. Once the image acquisition protocol has been initiated, the call handler workstation 202 or a computer system within the PSAP 212 may generate a unique identifying component, which will be used to identify an outgoing message from the call handler 104 to the caller 102 and a possible future incoming message or messages from the caller 102 to the PSAP 212. The unique identifying component may be a unique string of alphanumeric characters. The unique string may be generated based on the time of the request for the unique string, the previously generated unique string (e.g., the unique strings may be sequential), or on any other suitable methodology. In an implementation, the unique string may be a numeric string representing the date of the call along with a sequential number where the sequential number is reset to 1 at the beginning of each day. The unique identifying component may be stored in a database 208 along with or in relation to information that identifies a particular call between the caller 102 at the call handler 104.

Figure 4:
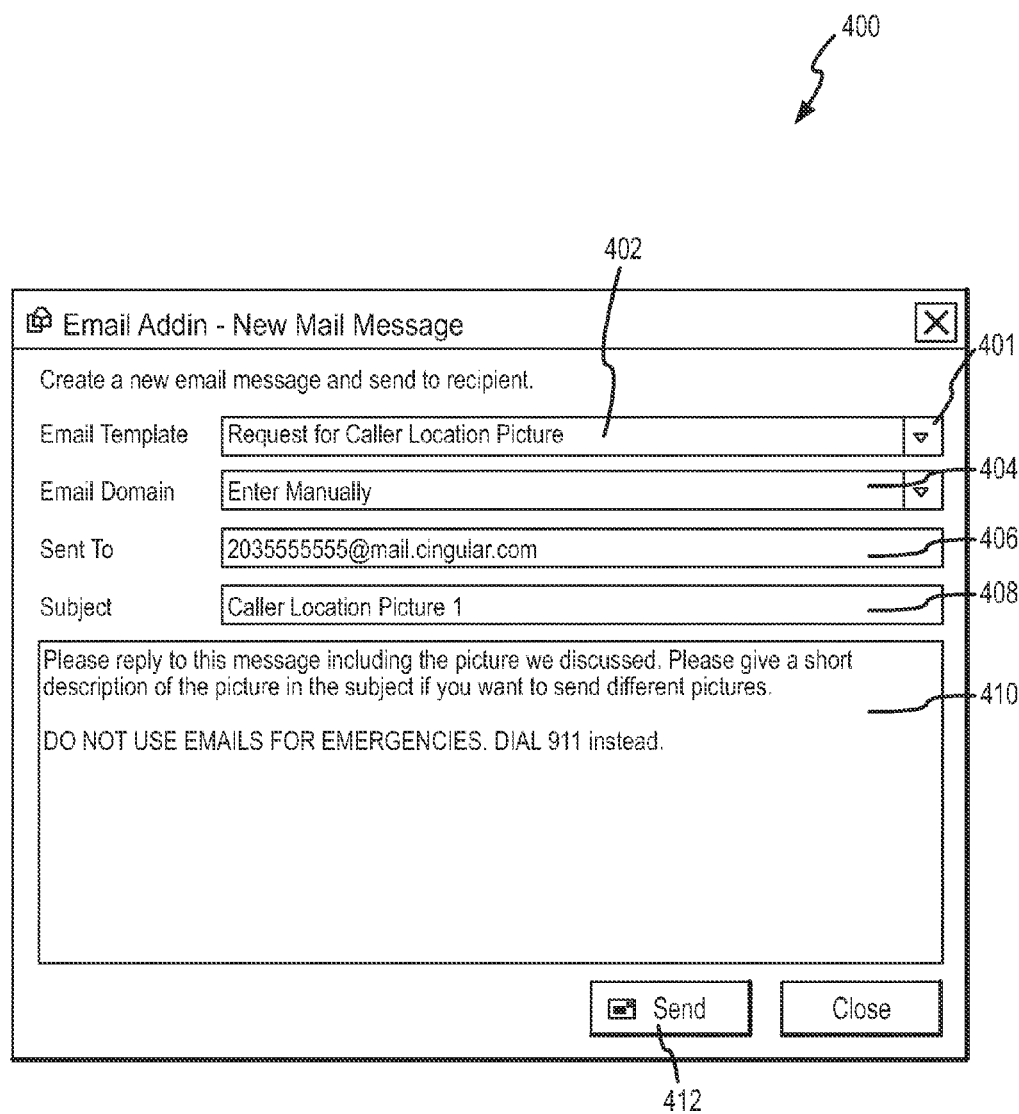
FIG. 4 is an illustration of a graphical user interface usable to generate an electronic mail message.

A pop-up window 400, such as that illustrated in FIG. 4, may be displayed on the terminal 206 in response to the initiation of the image acquisition protocol by the call handler 104. The pop-up window 400 may present multiple electronic mail templates to the call handler 104 in the form of a pull down list of electronic mail templates accessed by activating the pull-down menu button 401 adjacent to the electronic mail template window 402 and selecting an appropriate electronic mail template. For example, and as illustrated in FIG. 4, an electronic mail template may be titled "Request for Caller Location Picture." The electronic mail template "request for caller location picture" 402 may be one of several electronic mail templates available. Other electronic mail templates may, for example, include templates to instruct the caller 102 to provide images of: a location of an incident, a particular item such as a suspicious package, suspected hazardous material, a victim, a vehicle involved in an accident, and a suspect. Through the administration module 210, electronic mail templates may be added, removed or modified by administrative personnel.

Once an electronic mail template has been selected by the call handler 104 in step 310, pre-determined fields of the electronic mail may be automatically populated. For example as shown in the pop-up window 400 when the "request for caller location picture" electronic mail template is selected, the system may automatically populate the electronic mail with a subject 408 titled "caller location picture 1" and pre-determined text in the body 410 of the message. The predetermined text, as illustrated in FIG. 4, may include instruction on how to reply to the electronic mail. Not shown in FIG. 4, but nonetheless a part of the electronic mail message, is the unique identifying component which may be attached to the electronic mail message. For example, the unique identifying component may be located within a message header that is generally not displayed for a user. The header containing the unique identifying component may be a custom header. In one implementation, the outgoing email may include a custom header named "Call-ID."

The next step 312 may be for the call handler 104 to acquire a domain name for the caller 102. This step may include the call handler 104 determining the service provider of the caller 102 and selecting an appropriate domain name from a pulldown menu of domain names 404 located in the pop-up window 400. For example, and as illustrated in FIG. 4, the call handler 104 may determine that the caller's 102 service provider is Service Provider X. The call handler 104 may then select Service Provider X from the pull-down menu of domain names 404. The system may then automatically populate the "send to" field 406 with the domain name used by Service Provider X, which may be "@mail.ServProX.com". The call handler 104 may manually enter a domain name for the caller 102. The call handler 104 may then determine a phone number from which the caller 102 is calling and enter that information as the specific address in the "send to" field 406. The call handler 104 may obtain the caller's 102 domain name and/or phone number from the display of caller information presented to the call handler 104 on the terminal 206 of the call handler workstation 202. The call handler 104 may obtain the caller's 102 domain name and/or phone number by other methods such as, for example, asking the caller 102. Alternatively, the call handler workstation 202 may automatically populate the "send to" field 406 with the caller's 102 phone number and domain name. This may then be verified by the call handler 104 during the course of the call. Information correlating particular service providers to particular domain names used by users of that service may be present in the database 208. The database 208 may be accessible by the call handler 104. The database 208 may also be used to lookup domain names by the system when the call handler workstation 202 automatically populates the "send to" field 406. The database 208 may be updated through use of the administration module 210.

The next step 314 may be for the call handler 104 to enter any required custom instructions into the electronic mail message. The custom instructions may be generated as a result of the discussion between the call handler 104 and the caller 102. The next step 316 may be for the call handler 104 to send the electronic mail message to the caller 102. The call handler 104 may perform this function by clicking on or activating a send button 412 in the pop-up window 400.

The electronic mail message may then be transferred from the call handler workstation 202 to an outgoing electronic message processor 214. The outgoing electronic message processor 214 may send the electronic mail to the caller 102 over the Internet 226 and the caller's 102 cellular network 222. Accordingly, the next step 318 may be for the caller 102 to receive the electronic mail from the call handler 104. The outgoing electronic message processor 214 may packetize the outgoing message for delivery over the Internet 226 to the caller 102.

The caller 102 may generate a reply to the electronic message from the call handler 104 in the next step 320. This may be followed by the step 322 of the caller 102 attaching an image to the reply message. The image may have been previously captured or it may be captured after the caller 102 receives the electronic message from the call handler 104. As previously stated, the image may be a still image or a video image (e.g., a sequential series of still images with or without accompanying audio). The next step 324 may be for the caller 102 to send the reply message to the PSAP 212. By generating the reply message as a response to the electronic message from the call handler 104, the reply message may contain the unique identifying component that was part of the electronic message sent from the call handler 104 to the caller 102.

During typical operation, the incoming electronic message processor 216 may periodically pull incoming electronic messages (e.g., electronic mail messages) from a configured inbox by, for example, using POP3 protocol. Other protocols, however, may be used, such as the IMAP protocol. The inbox may be configured to receive and reassemble packetized messages. The incoming electronic message processor 216 may perform this function periodically at a predeterminable interval. The incoming electronic message processor 216 may perform this function in response to a specific request such as, for example, a request from the call handler 104 or a supervisor. The incoming electronic message processor 216 may be separate from the outgoing electronic message processor 214. Alternatively, the incoming electronic message processor 216 and the outgoing electronic message processor 214 may both be part of an electronic message processing module 228. For example, the functions described herein of the outgoing electronic message processor 214 and incoming electronic message processor 216 may both be performed by the same computer or electronic device.

Returning to the process illustrated in FIG. 3, the next step 326 may be for the incoming electronic message processor 216 to pull the incoming electronic mail from the caller 102 from the configured inbox. The next step 328 may be for the incoming electronic message processor 216 to correlate the unique identifying component contained within the reply electronic mail to the call between the caller 102 in the call handler 104. This may be followed by step 330 where the incoming electronic message processor 216 sends the reply message from the caller 102 to the call handler workstation 202 of the particular call handler 104 who is handling the call for the caller 102. The entire reply message may be sent to the call handler 104 or only the image contained within the message may be sent to the call handler 104.

The next step 332 may be for the call handler workstation 202 to display the visual information sent by the caller 102 along with information pertaining to the call between the caller 102 and the call handler 104. The display may be automatic in that it pops-up on the terminal 206 without any call handler 104 action. Alternatively, an alert may appear somewhere on the display screen of the call handler workstation 202 and/or an audible signal may be produced to alert the call handler 104 that an image is available. The call handler 104 may then activate a button or other feature to view the visual information.

Figure 5:
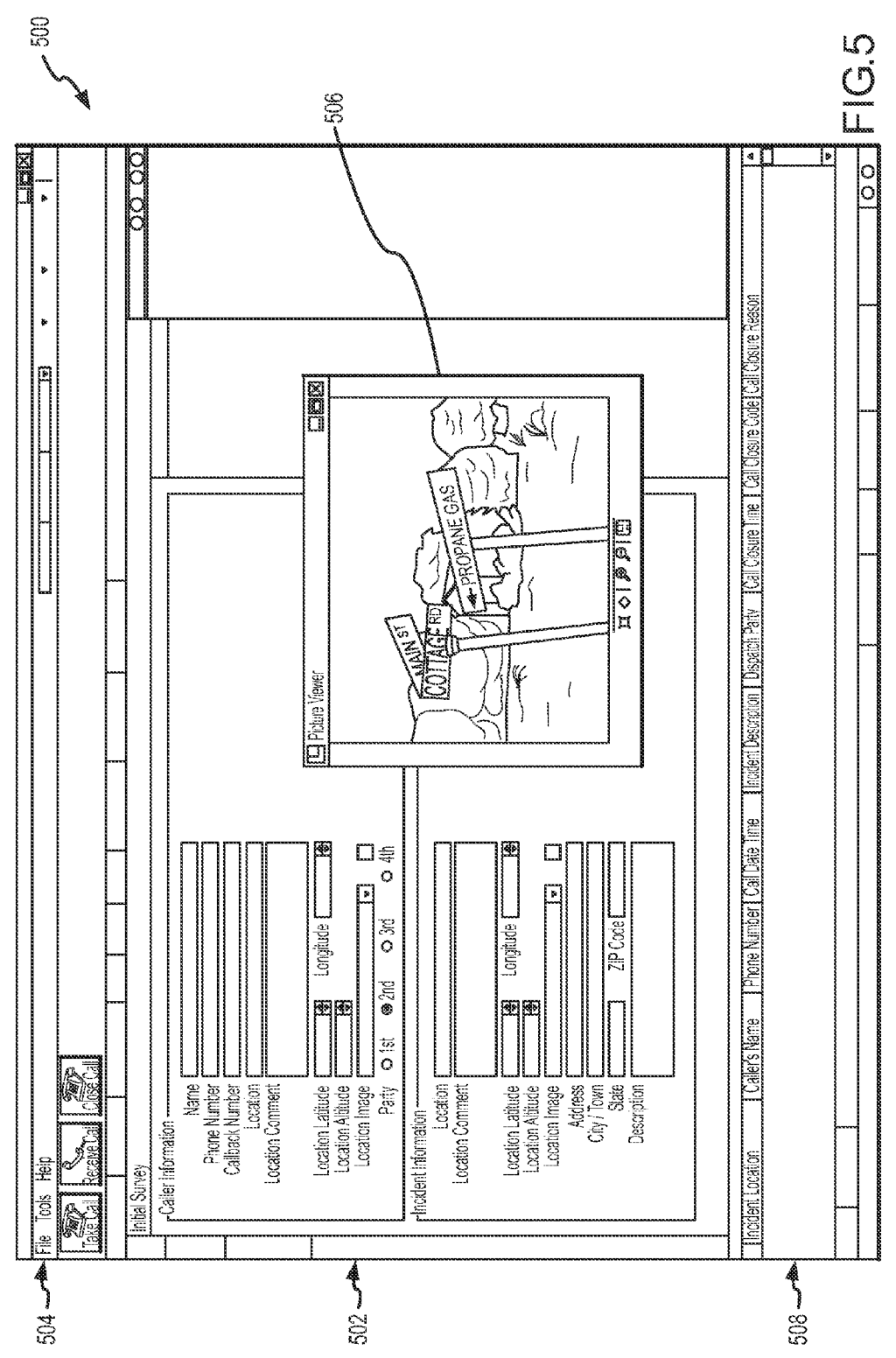

An example of a display including visual information according to step 332 is illustrated in FIG. 5. Call display window 500 is an exemplary window that may display call information on the terminal 206 of the call handler workstation 202. The call display window 500 may include a listing section 508 where recent calls to the PSAP 212 or to the particular call handler workstation 202 within the PSAP 212 may be displayed. This display, for example, may be in the form of a list as illustrated in FIG. 5. The main window 502 may display details of an in-process call between the call handler 104 and the caller 102. The main window 502 may display details of a particular call by selecting a call in the listing section 508. As illustrated in FIG. 5, the main window 502 is displaying details of an in-process call between the call handler 104 and the caller 102. As illustrated, such information may include caller 102 name, a phone number, and location.

Other information may also be displayed. Some of the information contained in the fields within the main window 502 may be populated automatically by the call handler workstation 202 with information derived from the original call. For example, known methods of transferring information between a caller and a receiver of that call such as caller ID and the aforementioned accessing of the ANIALI database may be used to populate fields within the main window 502. During the call between the call handler 104 and the caller 102, the call handler 104 may also manually populate fields within the main window 502 with information regarding the call as it is discovered by the call handler 104. Such information may include details about the situation that prompted the caller 102 to call the call handler 104 (e.g., by dialing 911).

Returning to the process illustrated in FIG. 3 and step 332 in particular, the display of the visual information sent by the caller 102 may take the form of a pop-up window 506 which may appear on the terminal 206 of the call handler workstation 202. The pop-up window 506 may appear or pop-up when the call to which the pop-up window 506 has been correlated is displayed in the main window 502. In this regard the visual information within the pop-up window 506 and the textual information within the main window 502 are linked and are configured to appear together on the terminal 206 of the call handler workstation 202.

The sequence of events with respect to the sending and receiving electronic messages between the caller 102 and the call handler 104 may vary, for example, depending on PSAP 212 protocols and capabilities and on equipment capabilities of the caller 102. For example, the caller 102 may place an emergency call that is routed to the PSAP 212 and during that call, receive and reply to the electronic mail sent by the call handler 104. In such a scenario, the pop-up window 506 may appear in front of the call handler 104 while the call handler 104 is still a direct audio communication with the caller 102. In another scenario, the caller 102 may disconnect from the call handler 104, then proceed to receive and reply to the electronic message of the call handler 104, and then reconnect with the call handler 104. This reconnection may be through the caller 102 initiating the call or through the call handler 104 initiating the call. In yet another scenario, the caller 102 may disconnect from the call handler 104, then proceed to receive and reply to the electronic mail message without ever reestablishing an audio connection with the call handler 104. As can be readily appreciated, other scenarios or sequences of audio communication and information transfer between the caller 102 any call handler 104 may take place.

Returning to the process illustrated in FIG. 3, in the next step 334, the call handler 104 may discuss the image within a pop-up window 506 with the caller 102. This discussion may, for example, relate to details of the image, the current situation of the caller 102, or any other topic regarding the situation that prompted the original call from the caller 102.

The next step 336 may be for the call handler 104 to forward the image (or images) to one or more in emergency services providers 106. Such a transfer of visual information between the call handler 104 located within the PSAP 212 and the emergency services provider 106 may be accomplished in a variety of ways. For example, the transfer of information may include transferring information over the Internet 226. Alternatively, the visual information may be transferred from the PSAP 212 to the emergency services provider 106 over the PSTN 224 (e.g., via facsimile transmission). The visual information may be transferred between the PSAP 212 and the emergency services provider 106 via a direct link such as a direct wireless link or a hardwired link between the emergency services provider 106 and the PSAP 212 (e.g., local area network or wireless network connection). Other methods known to those skilled in the art may also be used to transfer the visual information (e.g., hand deliver a print out of the visual information to the emergency services provider 106 in instances where the physical location of the PSAP 212 is close enough to the emergency services provider 106 to make such a delivery method reasonable).

The audio communication link between the caller 102, the call handler 104 and the emergency services provider 106 may continue to be active. In such a scenario, the emergency services provider 106 may request additional information of the caller 102, and the caller 102 may provide additional information in the form of additional verbal information or additional visual information. The various communication links may, for example, remain in place until (and after) the emergency services provider personnel arrive at the location of the caller 102.

After communication between the caller 102 and the call handler 104 has ended, information regarding that communication may be archived in step 338. The archived information may include details regarding the call, call handler 104 notes on the call, the original electronic mail message or electronic mail messages sent from the call handler 104 to the caller 102, and any replies, including any visual information, sent from the caller 102 to the PSAP 212. The archived information may be in the form of a CAD incident record. This archived information may be used later for various purposes including, for example, PSAP 212 performance review, law enforcement investigations, and general emergency situation forensic investigations. The information may be archived in the database 208.

Figure 6:
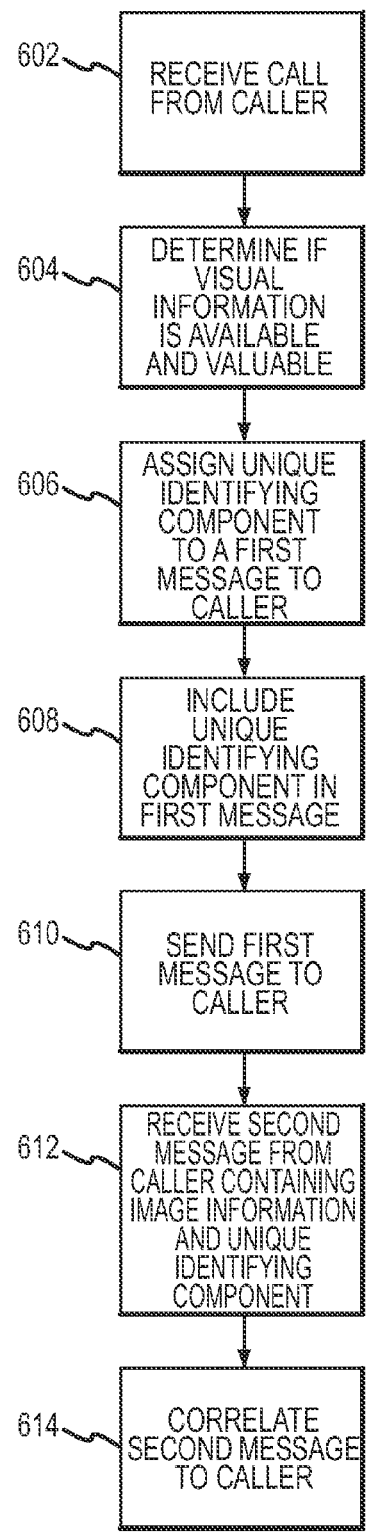
FIG. 6 is a flowchart of a method of communicating with a caller.

FIG. 6 illustrates, in flowchart form, a method of communicating with a caller. The first step 602 in the method is to receive a call from a caller. The call may be received over the PSTN, over the Internet (e.g., VOIP), over any other type of network, or over a combination thereof. The call may be emergency related. The next step 604 may be to determine if visual information is available and would be valuable to aid in the communication with the caller and/or the provision of emergency services.

The next step 606 may be to assign a unique identifying component to a first message to be sent to the caller. The first message may be an electronic mail message. The unique identifying component may be an alphanumeric sequence. The first message may be generated, in part, by selecting a message template from a plurality of message templates. The next step 608 may be to include the unique identifying component in the first message to the caller. The unique identifying component may be located within a header of the first message.

The next step 610 may be to send the first message to the caller. The first message may be sent to the caller over a computer network. The computer network may be the Internet. The first message may include instruction for replying to the first message. The instruction may direct the caller to attach visual information to a second reply message. A domain name used in addressing the first message may be determined based on the service provider of the caller. This determination may include interrogating a database where domain names are cross-referenced to service providers.

The next step 612 may be to receive a second message in response to the first message. The second message may include visual information. The second message may include the unique identifying component that was included in the first message. The unique identifying component may be located in a header of the second message. The second message may be generated by the caller attaching visual information to the second message. The visual information may be in the form of a digital image or digital video. The next step 614 may be to correlate the second message to the received call. The correlation may at least partially be based on the unique identifying component. The correlation step may include populating data fields within the database 208 with information regarding the correlation process. In an implementation, the populated fields include fields for the date and time the second message is received along with information on when and how the second message was correlated or matched to a call. The method may further include displaying the visual information along with information regarding the call. The method may further include forwarding information regarding the call and/or the visual information. This forwarding may be to an emergency services provider.

Figure 7:
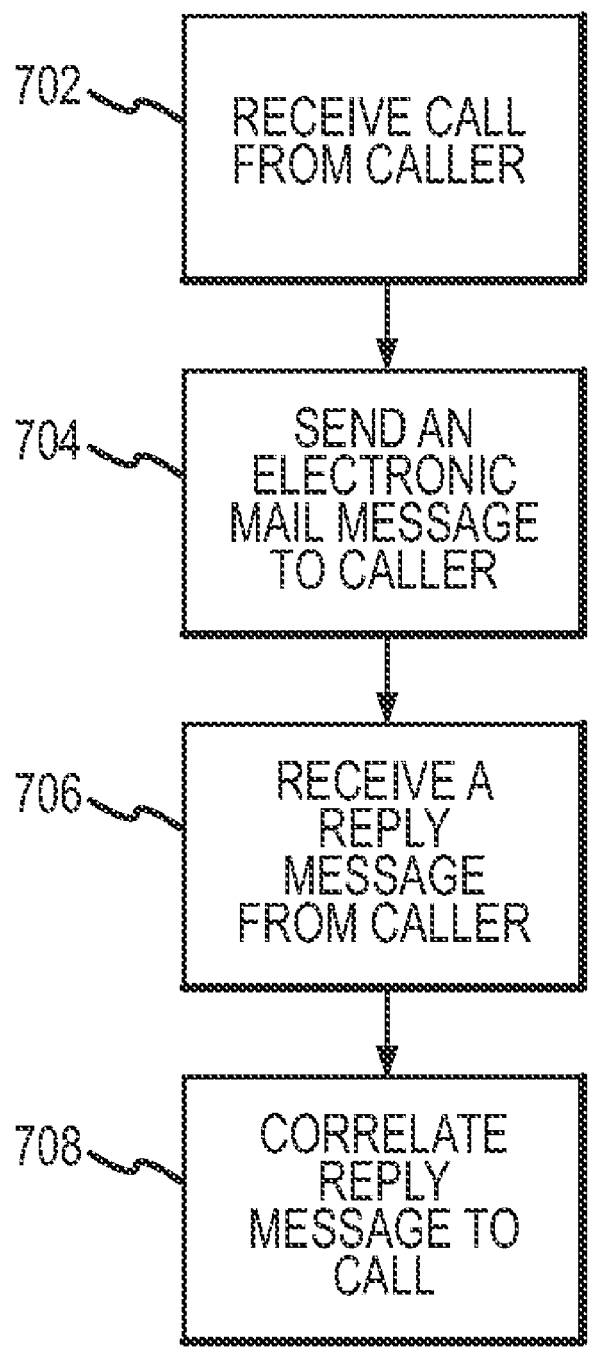
FIG. 7 is a flowchart of a method of correlating visual information to a call.

FIG. 7 illustrates, in flowchart form, a method of correlating visual information to a call. The first step 702 in a method may be to receive a call from a caller. The call may be emergency related. The following step 704 may be to send an electronic mail message to the caller, where the electronic mail message includes a unique identifying component. This may be followed by the step 706 of receiving a reply message from the caller that includes the unique identifying component. The next step 708 may be to correlate the reply message to the call, where the correlation is at least partially based on the unique identifying component. The visual information and information about the call may be displayed. The information regarding the call and the visual information may be forwarded to an emergency services provider. The electronic mail message may be generated by selecting a message template from a plurality of message templates.

When the aforementioned incoming electronic message processor 216 receives an electronic message and is unable to correlate that electronic message to a particular call, the uncorrelated electronic message may be forwarded to or stored in a unique location. This information may then be manually reviewed (e.g., by PSAP 212 personnel) to determine if the information (e.g., visual information attached to the message) contained within the message is pertinent to a current call, a recent call, or other emergency or significant event.

It will be appreciated that, although FIG. 2 illustrates a single call handler workstation 202 within the PSAP 212, typically a PSAP 212 will contain multiple call handler workstations 202 which may be manned by multiple call handlers 104 and that the systems described herein may be operable to forward the relevant electronic messages from the caller 102 to the particular call handler 104 in the PSAP 212 that is handling that particular call. It should also be appreciated that although a single database 208 is illustrated in FIG. 2, each database function described herein may be handled by a separate database. This database (or databases) may be accessed directly as illustrated in FIG. 2 or may be accessed through a connection through other means, such as through the Internet 226 or over the PSTN 224. The databases accessed by the call handler workstation 202 may include ALI (automatic location information) and WALI (wireless automatic location information) databases.

Due to the popularity of cell phones and other portable communication devices that possess the ability to capture and transfer visual images, the above descriptions have generally focused on communications between a caller 102 using a cell phone and a PSAP 212. However, the described apparatuses, systems and methods may also be used by callers using different types of equipment. For example, a caller who does not possess a camera phone may still be able to capture digital images and transfer them to the PSAP 212 if they, for example, have a digital camera, the means to download images to a computer, and Internet access from the computer. In such a circumstance, the call handler 104 may direct the outgoing electronic message to an electronic mail address of the user that the user will be able to receive at the computer.

Additionally, the apparatuses systems and methods described herein may be used to deliver non-visual information from the caller 102 to the call handler 104. For example, if the caller 102 perceives an emergency situation as a result of receiving a threatening electronic mail message, the apparatuses, systems and methods described herein may be used to forward the threatening electronic mail message to the call handler 104 and emergency services providers 106.

It will be appreciated that the apparatuses, systems and methods described herein have many uses outside the context of emergency situations and may be used by non-emergency call handling systems. For example, information services that may be enhanced through visual communication, such as services providing driving directions, may also utilize various aspects of the embodiments described herein.

While the invention has been illustrated and described in the drawings and foregoing description, such illustration and description is to be considered as exemplary and not restrictive in character. Embodiments of the invention and minor variants thereof have been shown and described. Those skilled in the art will appreciate variations of the above-described embodiments that fall within the scope of the invention. Protection is desired for all changes and modifications that come within the scope and spirit of the invention. Accordingly, the invention is not limited to the specific examples and illustrations discussed above.

What is claimed is:

1. An information processing system comprising:
   a network interface operable to receive and transmit packetized information over a computer network;
   a telephonic interface for audio communication between at least one call handler and at least one caller over a telephone network;
   a call handler interface operable to generate at least one outgoing message, wherein said call handler interface is operable to send said at least one outgoing message to said at least one caller, and wherein said at least one outgoing message comprises a unique identifying component, the unique identifying component further comprising a unique string of alphanumeric characters representing a date on which the outgoing message was first generated concatenated with a sequential serial number;
   a storage unit configured to store information related to said at least one caller; and
   a processing module communicatively coupled to said storage unit, said call handler interface, and said network interface, wherein said processing module is operable to correlate at least one incoming message received over said computer network to information related to said at least one caller and present, to said at least one call handler, said at least one incoming message correlated with said information related to said at least one caller.

2. The information processing system of claim 1, wherein said computer network is the Internet.

3. The information processing system of claim 1, wherein said telephone network comprises a Public Safety Answering Point.

4. The information processing system of claim 1, wherein said audio communication is emergency related, non-emergency related, or a combination thereof.

5. The information processing system of claim 4, wherein said audio communication is emergency related.

6. The information processing system of claim 1, wherein said at least one outgoing message is at least partially generated by said at least one call handler selecting an outgoing message template from a plurality of available outgoing message templates.

7. The information processing system of claim 1, wherein said call handler interface is operable to send said at least one outgoing message to said at least one caller at least partially over said computer network.

8. The information processing system of claim 1, wherein said unique identifying component is located in a message header of said generated at least one outgoing message.

9. The information processing system of claim 1, wherein said outgoing message is an electronic mail message.

10. An emergency call handling system comprising:
    a network interface module that sends and receives packetized information over a computer network;
    a communication interface interconnected with a public safety answering point;
    a call handler interface that generates an outgoing message, wherein said outgoing message comprises a unique identifying component, the unique identifying component further comprising a unique string of alphanumeric characters representing a date on which the outgoing message was first generated concatenated with a sequential serial number;
    a storage unit that stores information in a relational database where said unique identifying component is stored in relation to a record of a call; and
    a processing module communicatively coupled to said storage unit and said network interface, wherein said processing module correlates at least one incoming message received over said computer network to said record of said call.

11. The emergency call handling system of claim 10, wherein said computer network is the Internet.

12. The emergency call handling system of claim 10, wherein said outgoing message is at least partially generated by a call handler selecting an outgoing message template from a plurality of available outgoing message templates.

13. The emergency call handling system of claim 10, wherein said unique identifying component is located in a message header of said outgoing message.

14. The emergency call handling system of claim 10, wherein said outgoing message is an electronic mail message.

15. The emergency call handling system of claim 10, wherein said call handler interface displays at least part of said at least one incoming message and at least part of said record of said specific call.

16. A call handling system comprising:
    a database configured to store: a plurality of electronic message templates, information regarding a call from a caller, and a unique identifying component for said call, the unique identifying component further comprising a unique string of alphanumeric characters representing a date on which the outgoing message was first generated concatenated with a sequential serial number;

a call handler interface operable to enable a call handler to select an electronic message template from said plurality of electronic message templates, initiate the sending of an electronic message to said caller, wherein said electronic message contains said unique identifying component, and display said information regarding said call and an image contained in a response to said electronic message; and an electronic message processing module operable to correlate said information to said image.

17. The call handling system of claim 16, wherein said call is emergency related.

18. The call handling system of claim 16, wherein said unique identifying component is located in a message header of said electronic message.

19. A method of communicating with a caller comprising:
receiving a call from a caller over a telephone network;
deciding, based on said call, to obtain visual information from said caller;
assigning a unique identifying component to a first message, the unique identifying component further comprising a unique string of alphanumeric characters representing a date on which the outgoing message was first generated concatenated with a sequential serial number;
including said unique identifying component in said first message;
sending said first message to said caller after said including step;
receiving a second message in response to said first message, wherein said second message comprises visual information; and
correlating, at least partially based on said unique identifying component, said second message to said call.

20. The method of communicating with a caller of claim 19, wherein said call is emergency related.

21. The method of communicating with a caller of claim 19, further comprising:
generating said first message by selecting a message template from a plurality of message templates.

22. The method of communicating with a caller of claim 19, wherein said first message is an electronic mail message.

23. The method of communicating with a caller of claim 19, wherein said unique identifying component is located in a header of said first message.

24. The method of communicating with a caller of claim 19, wherein said first message is at least partially sent over the Internet.

25. The method of communicating with a caller of claim 19, wherein said first message comprises an instruction for replying to said first message.

26. The method of communicating with a caller of claim 25, wherein said instruction directs said caller to generate a reply to said first message and include visual information with said reply.

27. The method of communicating with a caller of claim 19, further comprising:

determining an electronic mail address for said caller and inserting said electronic mail address into said first message prior to said sending step.

28. The method of communicating with a caller of claim 27, wherein said determining step comprises:
looking up in a database a domain name for said caller, wherein said domain name is based on a service provider of said caller.

29. The method of communicating with a caller of claim 19, wherein said second message comprises said unique identifying component.

30. The method of communicating with a caller of claim 29, wherein said unique identifying component is located in a header of said second message.

31. The method of communicating with a caller of claim 19, wherein said second message is generated by said caller, said method further comprising:
attaching, by said caller, visual information to said second message prior to sending said second message.

32. The method of communicating with a caller of claim 19, further comprising:
displaying information about said call along with said visual information.

33. The method of communicating with a caller of claim 19, further comprising:
forwarding information regarding said call and said visual information.

34. The method of communicating with a caller of claim 33, wherein said forwarding is to an emergency services provider.

35. A method of correlating visual information to a call comprising:
receiving a call from a caller;
sending an electronic mail message to said caller, wherein said electronic mail message comprises a unique identifying component, the unique identifying component further comprising a unique string of alphanumeric characters representing a date on which the outgoing message was first generated concatenated with a sequential serial number;
receiving a reply message from said caller, said reply message comprising said unique identifying component and visual information; and
correlating, at least partially based on said unique identifying component, said reply message to said call.

36. The method of correlating visual information to a call of claim 35, wherein said call is emergency related.

37. The method of correlating visual information to a call of claim 35, further comprising:
generating said electronic mail message by selecting a message template from a plurality of message templates.

38. The method of correlating visual information to a call of claim 35, further comprising:
displaying information about said call and said visual information.

39. The method of correlating visual information to a call of claim 35, further comprising:
forwarding information regarding said call and said visual information to an emergency services provider.

* * * * *